UNITED STATES PATENT OFFICE.

RICHARD PEARCE, OF DENVER, COLORADO.

PROCESS OF EXTRACTING SILVER FROM COPPER ORES, MATTES, AND OTHER COPPER PRODUCTS.

SPECIFICATION forming part of Letters Patent No. 421,031, dated February 11, 1890.

Application filed October 13, 1888. Serial No. 287,981. (No specimens.)

*To all whom it may concern:*

Be it known that I, RICHARD PEARCE, a subject of the Queen of Great Britain, at present residing at Denver, in the county of Arapahoe and State of Colorado, have invented a new and Improved Process of Extracting Silver from Copper Ores, Mattes, and other Copper Products, of which the following is a full, clear, and exact description.

The invention relates to the well-known Ziervogel process; and its object is to provide a new and improved process for completely extracting all the silver from copper ores, mattes, or other copper products.

Copper ores and mattes containing silver with certain impurities—such as lead, bismuth, antimony, arsenic, &c.—when treated by the well-known Ziervogel process form compounds of silver with the above-named metals. The compounds of silver thus formed are insoluble, so that the operation of leaching them out by hot water fails on account of the impurities above named; hence a full extraction of all the silver is impossible.

With my improved process herein described I am enabled to more completely separate the silver.

In order to carry the process into effect, I first grind the copper ore, matte, or other copper product very fine and then mix the finely-ground substance with from two to five per cent. of sulphate of soda or sulphate of potassa, after which the mixture is roasted and then leached by hot water, in the usual manner, to obtain sulphate of silver. The amount of the sulphate of soda or sulphate of potassa mixed with the ground substance depends on the quantity of the named impurities contained in the matte. The alkaline sulphates are not changed during the process in any way to their corresponding sulphides. Double salts are formed with the sulphate of soda or sulphate of potassa and the sulphate of silver, which are less easily decomposed by heat than the sulphate of silver alone.

With the process described I am enabled to subject the mixture, when roasting the same, to a higher temperature without danger of decomposing the sulphate of silver to metallic silver, which latter is entirely insoluble in water. The percentage of silver thus rendered soluble by my improved process is considerably increased over that in the Ziervogel process as formerly employed.

Having thus described my invention, what I claim as new, and desire to secure by Letters Patent, is—

1. The process of separating silver from ores or mattes containing base metals, which consists in mixing with the finely-pulverized ore or mattes a quantity of sulphate of sodium or potassium equal to two per cent., then roasting the mixture, and finally leaching out by hot water to obtain the sulphate of silver.

2. The improved process for separating silver from copper ores and mattes containing lead, bismuth, antimony, arsenic, or other impurities, which process consists in mixing with the finely-pulverized copper ore or matte from two to five per cent. of sulphate of soda or potassa, then roasting the mixture, and finally leaching out by hot water to obtain the sulphate of silver, as shown and described.

RICHARD PEARCE.

Witnesses:
THEO. G. HOSTER,
C. SEDGWICK.